(12) United States Patent
Coffin et al.

(10) Patent No.: US 9,328,818 B2
(45) Date of Patent: May 3, 2016

(54) GEAR CARRIER FLEX MOUNT LUBRICATION

(71) Applicant: United Technologies Corporation, Hartford, CT (US)

(72) Inventors: James B. Coffin, Windsor, CT (US); Michael E. McCune, Colchester, CT (US); William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 627 days.

(21) Appl. No.: 13/727,868

(22) Filed: Dec. 27, 2012

(65) Prior Publication Data

US 2014/0087907 A1 Mar. 27, 2014

Related U.S. Application Data

(60) Provisional application No. 61/704,044, filed on Sep. 21, 2012.

(51) Int. Cl.
*F16H 57/04* (2010.01)
*F01D 25/18* (2006.01)
*F02C 7/36* (2006.01)

(52) U.S. Cl.
CPC ............ *F16H 57/0467* (2013.01); *F01D 25/18* (2013.01); *F02C 7/36* (2013.01); *F16H 57/0479* (2013.01); *F05D 2260/30* (2013.01); *F05D 2260/40311* (2013.01); *F05D 2260/98* (2013.01)

(58) Field of Classification Search
None
See application file for complete search history.

(56) References Cited

U.S. PATENT DOCUMENTS

| | | |
|---|---|---|
| 3,287,906 A | 11/1966 | McCormick |
| 5,391,125 A | 2/1995 | Turra et al. |
| 5,466,198 A | 11/1995 | McKibbin et al. |
| 5,472,383 A | 12/1995 | McKibbin |
| 5,915,917 A | 6/1999 | Eveker et al. |
| 6,223,616 B1 | 5/2001 | Sheridan |
| 7,011,599 B2 | 3/2006 | Becquerelle et al. |
| 7,214,157 B2 | 5/2007 | Flamang |
| 2008/0006018 A1 | 1/2008 | Sheridan et al. |
| 2010/0105516 A1 | 4/2010 | Sheridan et al. |
| 2010/0148396 A1 | 6/2010 | Xie et al. |
| 2010/0150702 A1 | 6/2010 | Sheridan |
| 2010/0331139 A1 | 12/2010 | McCune |

FOREIGN PATENT DOCUMENTS

| | | |
|---|---|---|
| EP | 1876338 | 1/2008 |
| GB | 1516041 | 6/1978 |

(Continued)

OTHER PUBLICATIONS

International Search Report and Written Opinion completed on Dec. 9, 2013 for International Application No. PCT/US2013/059440.

(Continued)

*Primary Examiner* — Erin D Bishop
(74) *Attorney, Agent, or Firm* — Carlson, Gaskey & Olds, P.C.

(57) ABSTRACT

An example epicyclic gear train assembly includes a flexure pin received by a carrier. The flexure pin and the carrier respectively include first and second pin apertures configured to receive a retainer pin. The flexure pin further includes a lubricant conduit separate from the first pin aperture.

14 Claims, 6 Drawing Sheets

(56) References Cited

FOREIGN PATENT DOCUMENTS

| GB | 2041090 | 9/1980 |
|---|---|---|
| WO | 2007038674 | 4/2007 |

OTHER PUBLICATIONS

International Preliminary Report on Patentability for International Application No. PCT/US2013/059440 mailed Apr. 2, 2015.
U.S. Appl. No. 13/561,176, filed Jul. 30, 2012 entitled Fan Drive Gear System Torque Frame Pin Retainer.
Brines, G.L. (1990). The turbofan of tomorrow. Mechanical Engineering: The Journal of the American Society of Mechanical Engineers, 108(8), 65-67.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Sweetman, B. and Sutton, O. (1988). Pratt & Whitney's Suprise leap, Interavia Business & Technology, 53.631, p. 25.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF502: plugging the turbofan gap. Flight International, pp. 237-241, Jan. 30, 1982.

GEAR CARRIER FLEX MOUNT LUBRICATION

CROSS REFERENCE TO RELATED APPLICATIONS

This application claims priority to U.S. Provisional Application No. 61/704,044, which was filed 21 Sep. 2012 and is incorporated herein by reference.

BACKGROUND

Turbomachines, such as gas turbine engines, typically include a fan section, a compression section, a combustion section, and a turbine section. Turbomachines may employ a geared architecture connecting portions of the compression section to the fan section.

The geared architecture may be secured to a carrier, which is coupled to a torque frame by a pin supported by bushings. The torque frame is secured to other portions of the engine. To limit skewed loading of the carrier and resulting gear misalignment, the torque frame supports the carrier in a way that limits bending loads on the carrier.

Relative motion between the torque frame pin, the torque frame, and the carrier may wear the various components. Limiting wear between these components may be difficult due to the locations of the interfaces between these components.

SUMMARY

An epicyclic gear train assembly according to an exemplary aspect of the present disclosure includes, among other things, a flexure pin received by a carrier. The flexure pin and the carrier respectively include first and second pin apertures configured to receive a retainer pin. The flexure pin further includes a lubricant conduit separate from the first pin aperture.

In a further non-limiting embodiment of the foregoing epicyclic gear train assembly, the lubricant conduit may communicate with a bearing lubricant supply that is outside the carrier.

In a further non-limiting embodiment of either of the foregoing epicyclic gear train assemblies, the lubricant conduit is a first lubricant conduit, and the carrier includes a second lubricant conduit that may communicate lubricant between the bearing lubricant supply and the first lubricant conduit.

In a further non-limiting embodiment of any of the foregoing epicyclic gear assemblies, the assembly may include a metering device that meters flow of lubricant from the second lubricant conduit to the first lubricant conduit.

In a further non-limiting embodiment of any of the foregoing epicyclic gear train assemblies, the metering device may be partially received within the flexure pin.

In a further non-limiting embodiment of any of the foregoing epicyclic gear train assemblies, the lubricant conduit may deliver lubricant to an interface between the flexure pin and a bushing.

In a further non-limiting embodiment of any of the foregoing epicyclic gear train assemblies, the assembly may include a torque frame that receives the bushing.

In a further non-limiting embodiment of any of the foregoing epicyclic gear train assemblies, the retainer pin may be a bolt.

In a further non-limiting embodiment of any of the foregoing epicyclic gear train assemblies, the lubricant conduit may comprise a first portion extending transverse to an axis of rotation of a gear, and a second portion extending parallel to the axis of rotation of the gear.

In a further non-limiting embodiment of any of the foregoing epicyclic gear train assemblies, the assembly may include a clocking feature on an outer surface of the flexure pin, the clocking feature indicating the position of the first pin aperture.

A fan drive gear system according to an exemplary aspect of the present disclosure includes, among other things, a carrier receiving a carrier bushing. A torque frame receives a torque frame bushing. A flexure pin is received by the carrier bushing and the torque frame bushing. The carrier and the flexure pin each provide a portion of a lubricant conduit configured to deliver lubricant to an interface between the flexure pin and at least one of the carrier bushing and the torque frame bushing.

In a further non-limiting embodiment of the foregoing fan drive gear system, the carrier flexure pin and the carrier respectively may include first and second pin apertures configured to receive a retainer pin.

In a further non-limiting embodiment of either of the foregoing fan drive gear systems, the lubricant conduit may communicate with a bearing lubricant supply that is outside the carrier.

In a further non-limiting embodiment of any of the foregoing fan drive gear systems, the carrier may support multiple circumferentially spaced intermediate gears and the torque frame may have multiple circumferentially spaced projections secured to the carrier.

A method of lubricating a turbomachine interface according to an exemplary aspect of the present disclosure includes, among other things, securing a carrier relative to a torque frame using a flexure pin, lubricating an interface of the flexure pin using a lubricant that has moved through a lubricant passage in the carrier. The torque frame includes a lubricant passage.

In a further non-limiting embodiment of the foregoing method of lubrication, the lubricant may move to the lubricant passage in the carrier from a lubricant supply that is outside the carrier.

In a further non-limiting embodiment of any of the foregoing methods of lubrication, the method may include limiting movement of the pin using a retainer pin extending from the carrier through a hole in the flexure pin.

In a further non-limiting embodiment of any of the foregoing methods of lubrication, the hole and the lubricant passage may be nonintersecting.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
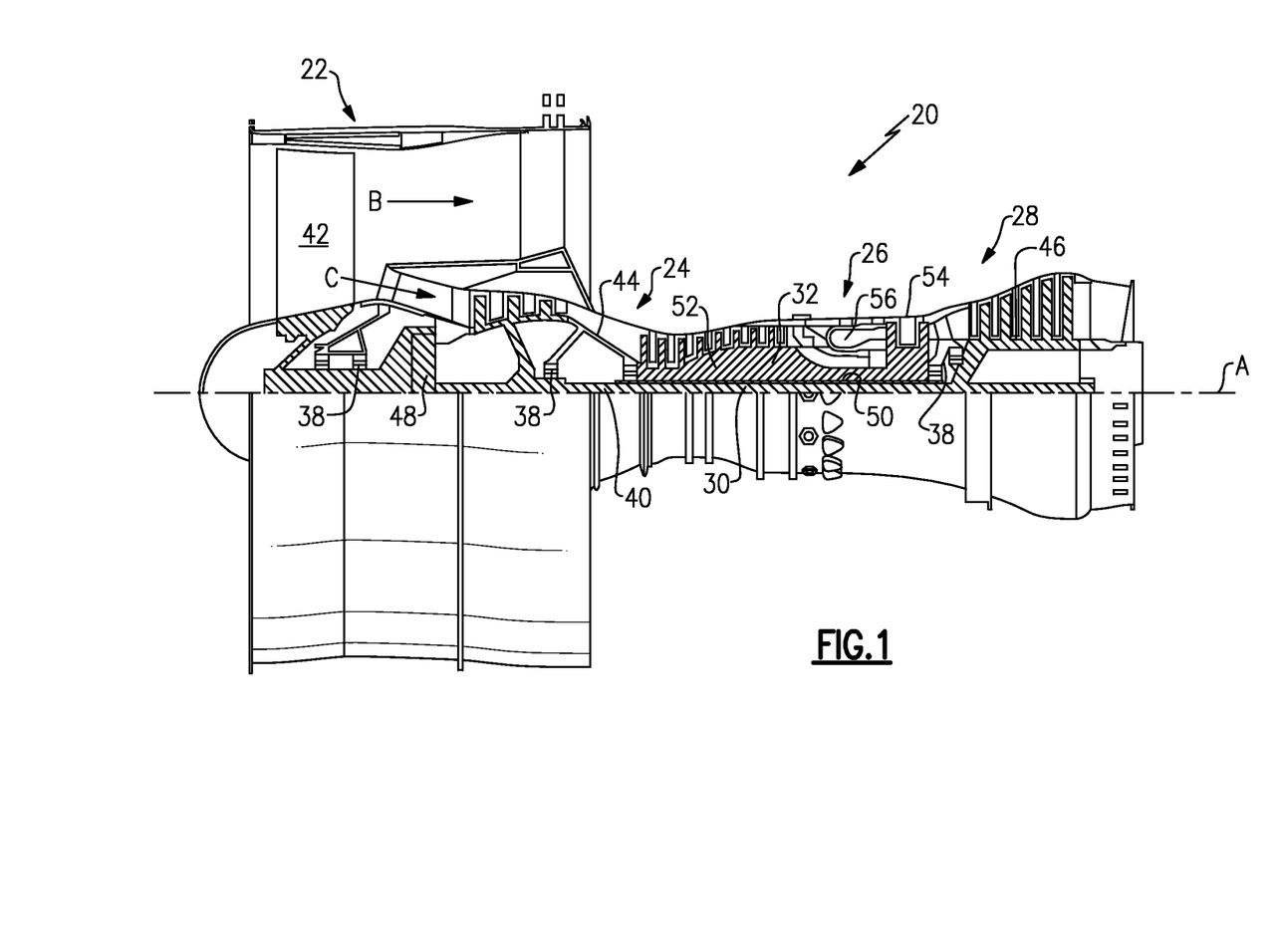
FIG. 1 shows a cross section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, airflow moves from the fan section 22 to a bypass flowpath B and a core flowpath C. Airflow from the bypass flowpath B generates most of the forward thrust produced by the engine 20. The compression section 24 drives air along the core flowpath C. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system, a star gear system, or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.3 (2.3 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 prior to a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(Tram\ °R)/(518.7°R)]^{0.5}$. The Temperature represents the ambient temperature in degrees Rankine. The Low Corrected Fan Tip Speed according to one non-limiting embodiment of the example engine 20 is less than about 1150 fps (351 m/s).

Figure 2:
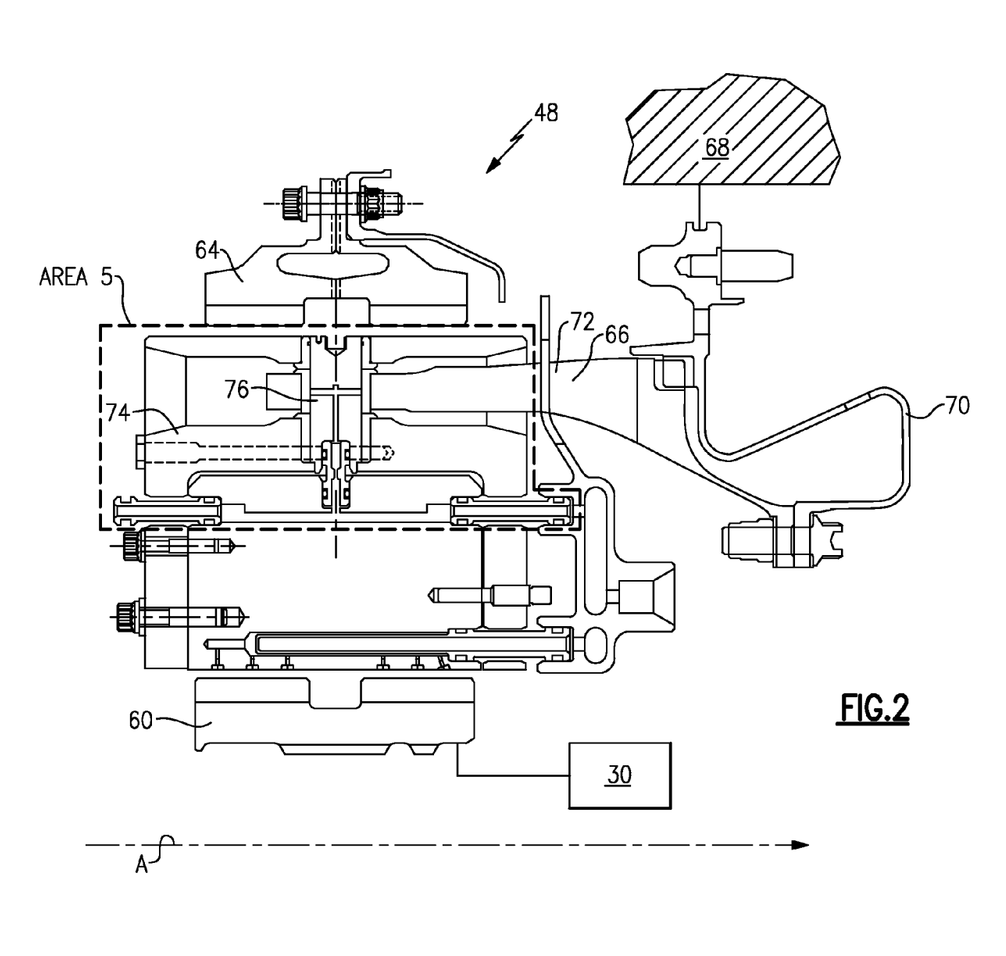
FIG. 2 shows a side view of a geared architecture and a carrier of the turbomachine of FIG. 1.
Figure 3:
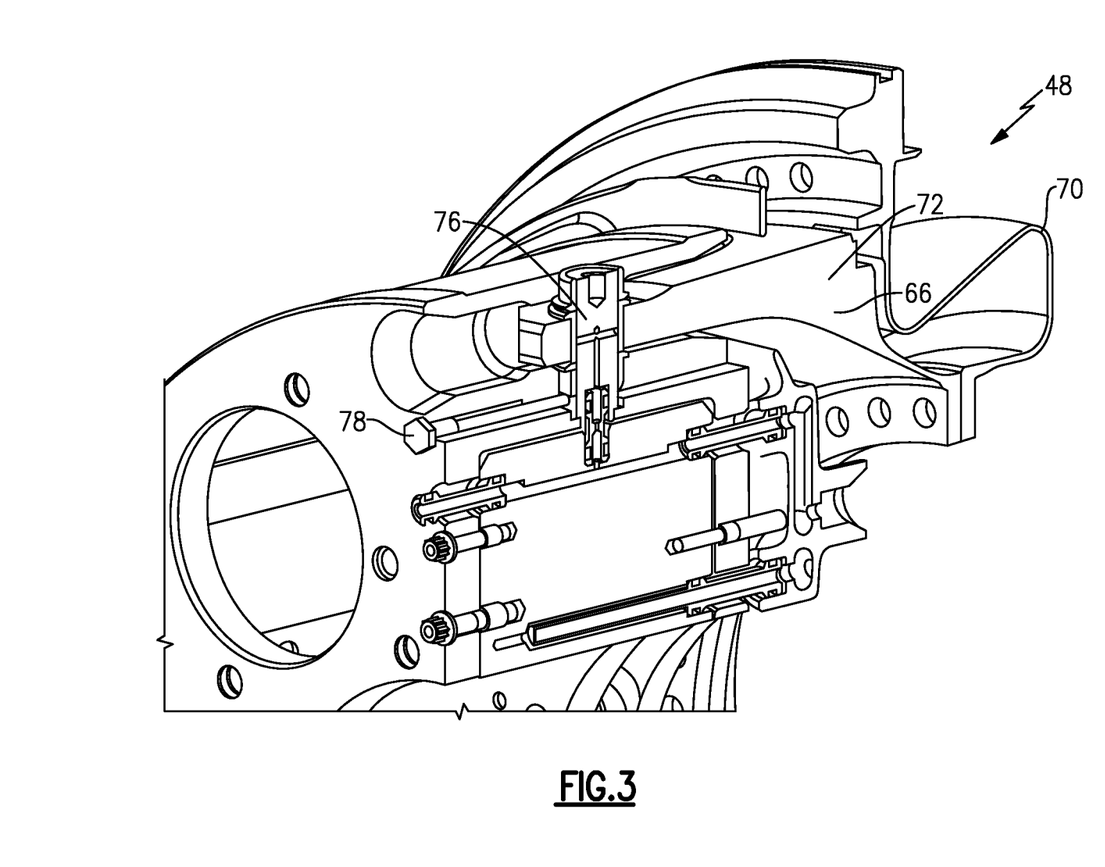
FIG. 3 shows a perspective view of the geared architecture and carrier of FIG. 2.
Figure 4:
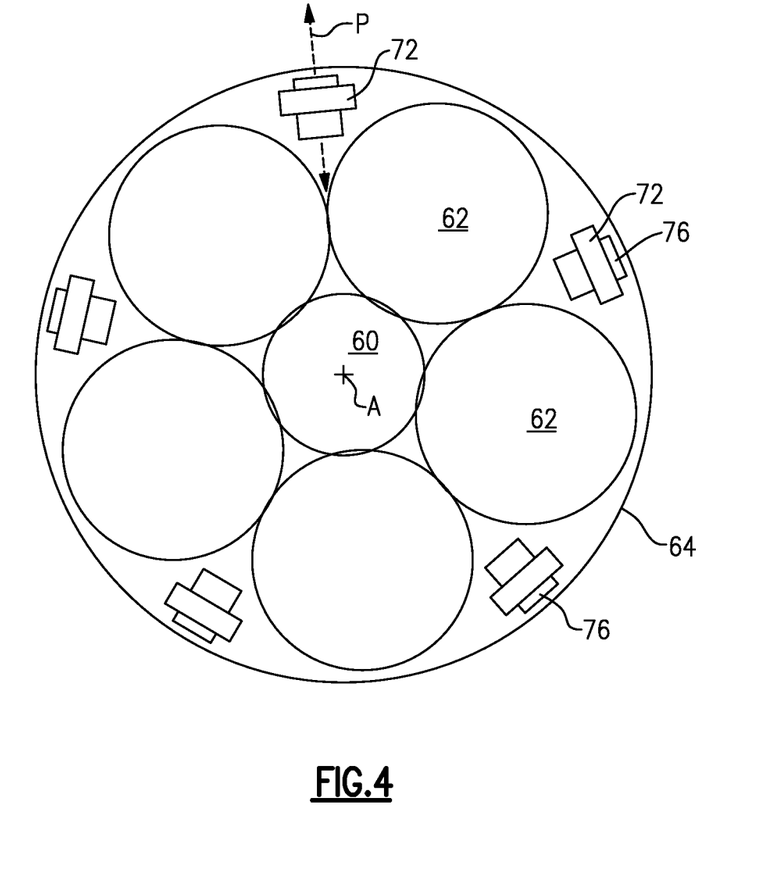
FIG. 4 shows a schematic view of the FIG. 3 carrier.

One example geared architecture 48, a star configuration, is illustrated in FIGS. 2 to 4. The low-speed spool 30 rotationally drives an input sun gear 60 about an axis A. Intermediate star gears 62 (shown in FIG. 4) are arranged circumferentially about and intermesh with the input sun gear 60. A ring gear 64 surrounds and intermeshes with the intermediate gears 62. In the example star configuration shown, the ring gear 64 rotationally drives the fan 42 (FIG. 1) via the fan shaft. In another, planetary example geared architecture, the intermediate gears 62 (via a torque frame 66) drive a fan shaft to drive the fan 42.

The example geared architecture 48 is the type in which the intermediate gears 62 are rotationally fixed relative to the rotational axis of the input gear 60. That is, the star gears are permitted to rotate about their respective rotational axes but do not rotate about the rotational axis of the input gear 60.

A relatively static structure 68 of the engine 20 holds a flex support 70. The torque frame 66 is affixed to the flex support 70 to prevent rotation of the torque frame 66 about the rotational axis A of the input gear 60. In a planetary configuration, the torque frame 66 would rotate about the rotational axis A and the ring gear 64 would be coupled to the fixed structure.

The torque frame 66 includes multiple projections 72 (or arms). In one example, the torque frame 66 includes five equally circumferentially spaced projections 72 secured to a carrier 74 circumferentially between the intermediate gears 62. The torque frame 66 is fixed to the carrier 74 by means of a flexure pin 76. The flexure pin 76 transmits reaction torque from the carrier 74 to the static structure 68 without transmitting significant bending loads into the carrier 74. The example carrier 74 supports at least the intermediate gears 62.

Referring to 5-7 with continuing reference to FIGS. 2-4, each flexure pin 76 extends longitudinally along a respective axis P extending radially relative to the axis A. The example flexure pin 76 provides an aperture or hole 80 extending perpendicular to the axis P. In this example, portions of the hole 80 may be completed by the carrier 74. In another example, the entire circumference of the hold 80 is provided by the flexure pin 76. The hole 80 in the flexure pin 76 is aligned with a corresponding aperture or hole 82 in the carrier 74. Hole 82 in the carrier 74 has an end that is accessible from outside the carrier 74. That is, hole 82 completely extends axially through a portion of the carrier 74. As will be explained, the hole 80 is offset from the axis P.

Figure 5:
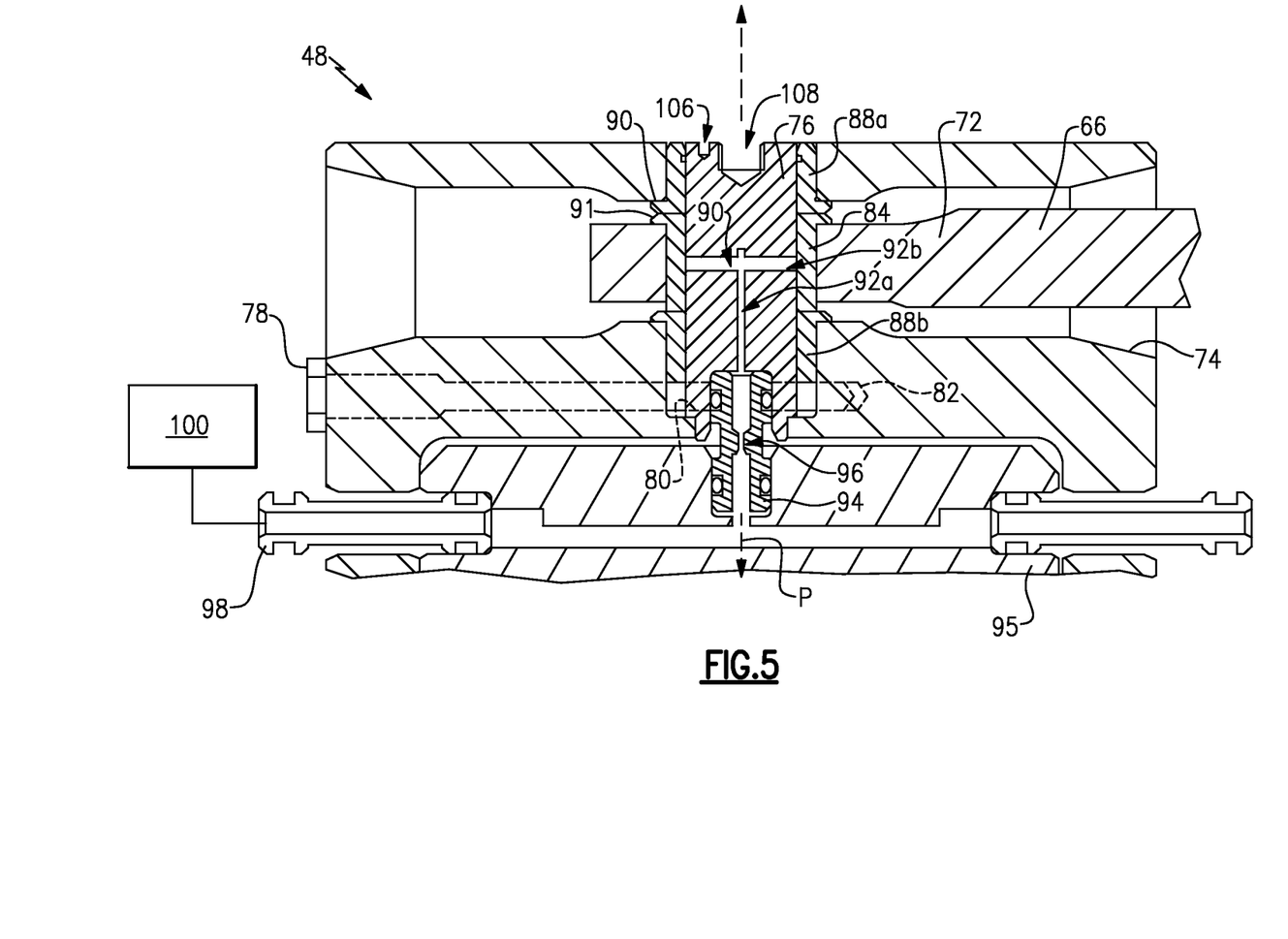
FIG. 5 shows a close-up view of area 5 in FIG. 2.
Figure 6:
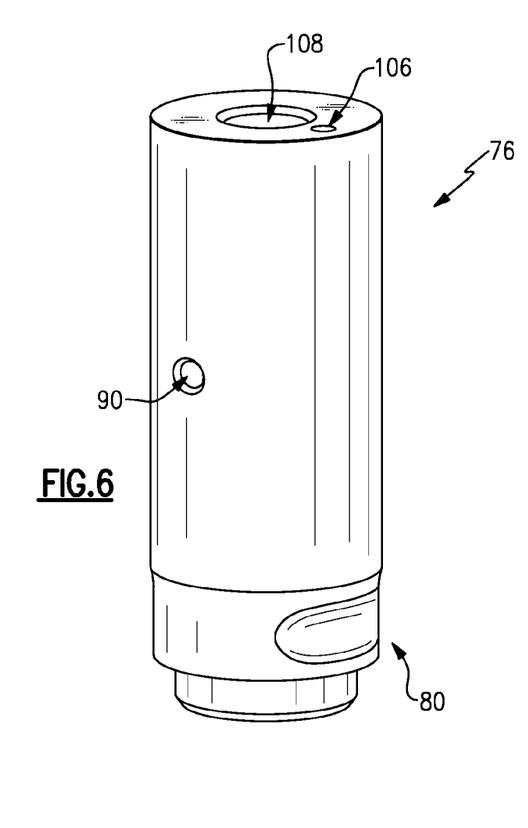
FIG. 6 shows a perspective view of a flexure pin from the carrier of FIG. 2.
Figure 7:
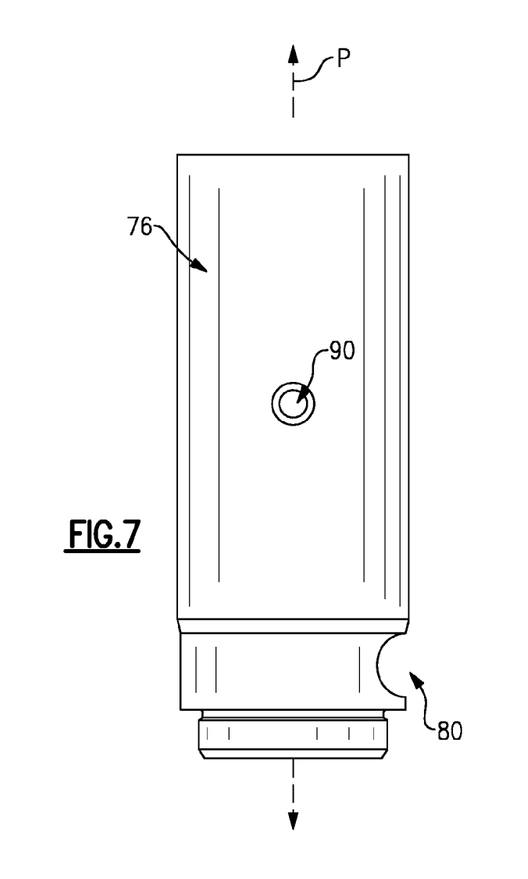
FIG. 7 shows a side view of the FIG. 6 flexure pin.

The flexure pin 76 is moveable to a position where the holes 80 and 82 are coaxial and are axially aligned to form a passage to accept a retainer pin 78, which, in this example, is inserted into the axially aligned holes 80 and 82 from one side of the carrier 74. The retainer pin 78 is perpendicular to the flexure pin 76 when the retainer pin 78 is installed within the holes 80 and 82.

The example retainer pin 78 prevents radial and rotational movement of the flexure pin 76, relative to the carrier 74. In this example, the flexure pin 76 is made of nitralloy and is hardened (nitrided) to achieve wear resistance.

The example retainer pin 78 is be made of a 418 stainless steel, such as Greek Ascoloy® or another hard metallic alloy, and has a smooth cylindrical outer surface. The retainer pin 78 is axially slidable with respect to the aligned holes 80 and 82. Additionally, the example retainer pin 78 may be, threaded, partially threaded, or unthreaded. Unthreaded and partially threaded retainer pin embodiments may be inserted, as a bolt, into the aligned holes 80 and 82 without rotation or substantially without rotation.

When the holes 80 and 82 are aligned, the retainer pin 78 can then be inserted into the hole 82. An axial load can then be applied to the retainer pin 78 using a press tool, for example, to push the retainer pin 78 into and through the holes 80 and 82 until the retainer pin 78 bottoms out on the carrier 74. A fastener can then be installed to prevent the retainer pin 78 from backing out during engine operation. The retainer pin 78 may also include locking threads to prevent such backing out.

Apertures in the projections 72 of the torque frame 66 each receive a torque frame bushing 84. Apertures in the carrier 74 receives carrier bushings 88a and 88b. The flexure pin 76 is held by the bushings 84, 88a, and 88b.

The torque frame bushing 84 is press fit into the projection 72 to limit relative rotation between the torque frame bushing 84 and the projection 72. The carrier bushings 88a and 88b are similarly press fit into the carrier 74. The press fit limits relative motion between the bushings 88a and 88b and the carrier 74. The torque frame bushing 84 and the carrier bushings 88A and 88B have flanges 91 that facilitate installation and limit radial movement relative to the carrier 74 and the projection 72. The example bushings are made of AMS 4590, which is chemically compatible with the projection 72 and the carrier 74. The bushings may be sacrificial in some examples.

The interface or "fit" between the carrier bushings 88a and 88b, and the flexure pin 76 is relatively loose—the interface between the torque frame bushing 84 and the flexure pin 76 is even looser. Structuring the interfaces in this way permits the flexure pin 76 to move about the axis P relative to the torque frame bushing 84 as the surrounding environment flexes and adjusts during operation. The structure also permits lubricant to flow between the flexure pin 76 and the torque frame bushing 84. The flexure pin 76 may move about the axis P relative to the carrier bushings 88a and 88b should the flexure pin 76 become stuck to the torque frame bushing 84.

In this example, a lubricant conduit 90 delivers lubricant to an interface between the torque frame bushing 84 and the flexure pin 76. The delivered lubricant facilitates relative movement between the flexure pin 76 and the torque frame bushing 84. The lubricant conduit 90 includes a first portion 92a and a second portion 92b. The first portion 92a extends through the flexure pin 76 along the axis P. The second portion 92b extends radially (relative to the axis P) from the first portion 92a.

Notably, the hole 80 is radially offset from the axis P such that the hole 80 and the lubricant conduit 90 do no intersect. This ensures that lubricant stays within the lubricant conduit 90 rather than escaping through the hole 80.

A metering device, such as a jumper tube 94, communicates lubricant to the flexure pin 76. The jumper tube 94 provides a portion of the lubricant conduit 90. The jumper tube 94 includes a portion received within the flexure pin 76. Another portion of the jumper tube 94 extends into a spray bar 95 of the geared architecture 48. The jumper tube 94 includes a narrowed portion 96 that depressurizes or meters flow of lubricant into the flexure pin 76. Metering the flow limits loss of oil in the event of a seal failure or excessive wear in the torque frame bushing 84.

The jumper tube 94 receives lubricant from a portion of the lubricant conduit 90 that extends in a direction parallel to the engine axis A through the spray bar 95 from the jumper tube 94 to a jumper tube 98. The jumper tube 98 provides the axially outermost portions of the lubricant conduit 90 in this example.

The jumper tube 98 receives lubricant from a lubricant supply 100 that is axially outside the carrier 74. The supply 100 may additionally provide lubricant to the spray bar 95. The supply 100 is clean lubricant relative to the lubricant within geared architecture 48 because the lubricant from the supply 100 has not moved through the gears of the geared architecture 48 immediately prior to being delivered to the flexure pin 76. Moving lubricant to the interface between the torque frame bushing 84 and the flexure pin 76 from the supply 100 rather than from the geared architecture 48 reduces the likelihood for debris and contaminants being introduced to the interface.

After the lubricant moves to the interface between the torque frame bushing 84 and the flexure pin 76, the lubricant moves in the direction of the axis P and is collected in a sump (not shown). The lubricant may then be cleaned and recirculated into the lubricant supply 100.

The example flexure pin 76 includes a clocking feature 106 that is used to align the flexure pin 76 during assembly such that the hole 80 lines up with the hole 82. The clocking feature 106 reveals the orientation of the flexure pin 76 relative to the axis P so that an operator can more easily align the hole 80 with the hole 82. The clocking feature 106 may also enable the operator to align the second portion 92b of the lubricant conduit 90 parallel to the engine axis A.

The flexure pin 76 also includes a removal feature 108. A tool engages the removal feature 108 to loosen the flexure pin 76 from the bushings 84, 88a, and 88b so that the flexure pin 76 can be removed. The removal feature 108 is threaded in some examples.

Features of the disclosed examples include a cost effective, reliable method of lubricating and retaining a carrier of a geared architecture. The lubrication orifices delivering lubricant to the bushings are parallel to a centerline of the engine. Further, relative motion between the torque frame pin, the torque frame, and the carrier may occur without wearing the various components.

Although an example embodiment has been disclosed, a worker of ordinary skill in this art would recognize that certain modifications would come within the scope of the claims. For that reason, the following claims should be studied to determine their true scope and content.

We claim:

1. An epicyclic gear train assembly comprising:
   a flexure pin received by a carrier, the flexure pin and the carrier respectively including at least portions of first and second pin apertures configured to receive a retainer pin, wherein the flexure pin further includes a lubricant conduit separate from the first pin aperture.

2. The epicyclic gear train assembly of claim 1, wherein the lubricant conduit communicates with a bearing lubricant supply that is outside the carrier.

3. The epicyclic gear train assembly of claim 2, wherein the lubricant conduit is a first lubricant conduit, and the carrier includes a second lubricant conduit that communicates lubricant between the bearing lubricant supply and the first lubricant conduit.

4. The epicyclic gear train assembly of claim 3, including a metering device that meters flow of lubricant from the second lubricant conduit to the first lubricant conduit.

5. The epicyclic gear train assembly of claim 4, wherein the metering device is partially received within the flexure pin.

6. The epicyclic gear train assembly of claim 1, wherein the lubricant conduit delivers lubricant to an interface between the flexure pin and a bushing.

7. The epicyclic gear train assembly of claim 6, including a torque frame that receives the bushing.

8. The epicyclic gear train assembly of claim 1, wherein the retainer pin is a bolt.

9. The epicyclic gear train assembly of claim 1, wherein the lubricant conduit comprises a first portion extending transverse to an axis of rotation of a gear, and a second portion extending parallel to the axis of rotation of the gear.

10. The epicyclic gear train assembly of claim 1, including a clocking feature on an outer surface of the flexure pin, the clocking feature indicating the position of the first pin aperture.

11. A fan drive gear system comprising:
a carrier receiving a carrier bushing;
a torque frame receiving a torque frame bushing;
a flexure pin received by the carrier bushing and the torque frame bushing, wherein the carrier and the flexure pin each provide a portion of a lubricant conduit configured to deliver lubricant to an interface between the flexure pin and at least one of the carrier bushing and the torque frame bushing.

12. The fan drive gear system of claim 11, wherein the flexure pin and the carrier respectively include first and second pin apertures configured to receive a retainer pin.

13. The fan drive gear system of claim 11, wherein the lubricant conduit communicates with a bearing lubricant supply that is outside the carrier.

14. The fan drive gear system of claim 11, wherein the carrier supports multiple circumferentially spaced intermediate gears and the torque frame has multiple circumferentially spaced projections secured to the carrier.

* * * * *